July 3, 1956

G. A. MOSITES 2,753,230

SLUSH PUMP PISTON

Filed Sept. 2, 1954

GEORGE A. MOSITES
INVENTOR.

BY Herbert J. Brown
atty.

United States Patent Office 2,753,230
Patented July 3, 1956

2,753,230

SLUSH PUMP PISTON

George A. Mosites, Fort Worth, Tex.

Application September 2, 1954, Serial No. 453,908

1 Claim. (Cl. 309—4)

This invention relates to pistons, and more particularly to pistons for slush pumps such as those used for circulating drilling fluid in rotary drilling operations.

Pistons for the described purpose are conventionally comprised of round metal bodies having cylindrical portions of solid rubber, neoprene or the like, mounted on the ends thereof and adapted to engage the cylinder wall of the pump. Since the liquids circulated contain abrasives, the rubber or rubber-like portions become worn after relatively short periods of service and must be replaced. However, it is to be understood that the rubber referred to wears longer than steel pistons having metal to metal contact by reason of the abrasives suspended in the fluid being pumped. Such conventional constructions are further objectionable in that the drilling fluid enters between the piston body and the conventional solid rubber or rubber-like parts and then works its way between the body and the rubber to the cylinder's surface where it causes additional wear and leakage.

An object of the invention is to provide a piston capable of longer use than the referred to conventional construction.

Another object is to provide a piston having a resilient rubber or rubber-like part contacting the inner surface of the cylinder in which it operates, yet one which prevents leakage between the piston body and the resilient part.

A particular object, in addition to the foregoing, is to provide a slush pump piston capable of being expanded after initial wear for increasing its term of usefulness.

A further object of the invention is to provide a piston having positive contact with the cylinder at all times.

A further object of the invention is to provide a slush pump piston having fewer parts, thereby reducing the cost of manufacture.

An additional object of the invention is to provide a slush pump piston having positive contact with the piston cylinder, yet one capable of being easily installed.

These and other objects will become apparent from the following description and the accompanying drawing of an exemplary form of the invention, wherein.

Figure 1:
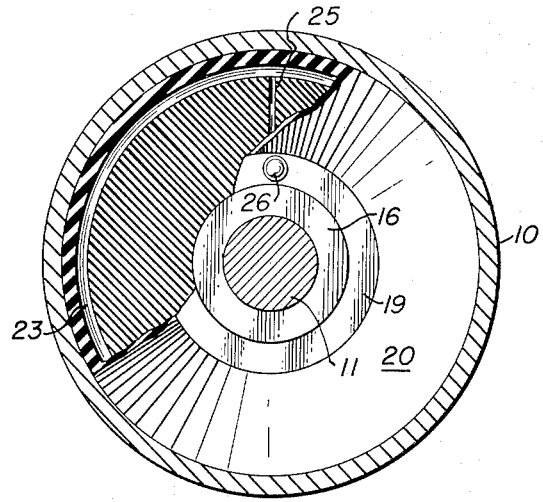
Figure 1 is a transverse sectional view of a pump cylinder and showing, in broken section, a piston therein embodying the features of the invention.
Figure 2:
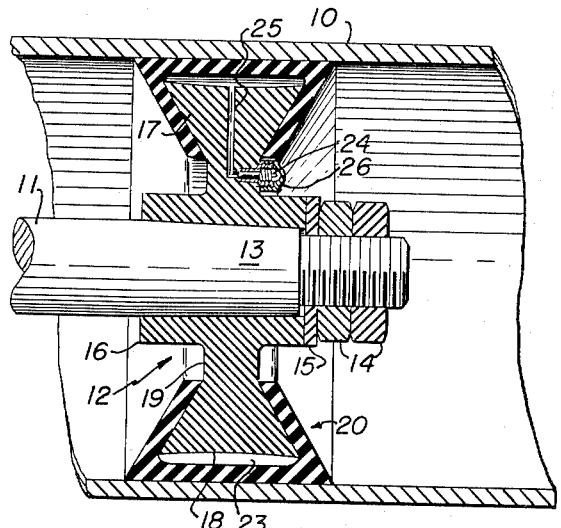
Figure 2 is a longitudinal broken sectional view of the cylinder and piston illustrated in Figure 1.

In the drawing, the numeral 10 indicates a pump cylinder having a piston rod 11 mounted in the usual manner for reciprocating action therein. The present pump body 12 is mounted on the tapered end 13 of the rod 11 and is held in place by means of nuts 14 and a washer 15.

The piston body 12 is cylindrical, as at 16, where it engages the tapered portion 13 of the rod 11, and the outer portion of the body 12 is triangular in cross section, as at 17, and which arrangement provides a substantially wide cylindrical periphery 18 which is circularly concave. The referred to triangular portion 17 is connected with the inner cylindrical portion 16 by means of an integral flange 19.

Figure 3:
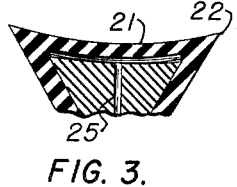
Figure 3 is a longitudinal sectional view, similar to Figure 2, of the periphery of the present piston, and showing the inflatable rubber portion in its deflated or normal position.

The side and end surfaces of the outer body portion 17 are covered with a resilient rubber like member 20 which is also substantially triangular in cross section and the sides of which are bonded to the outer surfaces of the triangular portion 17 of the piston body 12. It is to be understood that various means may be employed for securing the resilient member 20 in place, and that there are suitable bonding methods now available for that purpose. Also, to those versed in the art, it will be apparent that round dished retainers, such as employed in conventional slush pumps, may be added for further securing the resilient member 20 in place. As shown in Figure 3, the outer surface of the resilient member 20 is normally concave as at 21, providing relatively sharp corners or seals when the piston is installed in the cylinder 10. The outer peripheries 22 of the resilient member 20 are of slightly larger diameter than the diameter of the cylinder 10 thus assuring positive action during the pumping operation.

The space 23 between the inner surface of the resilient member 20 and the concave surface 18 of the body 12 provides an air chamber 23 and whereby the outer portion of said resilient member may be inflated. In the preferred form of the invention, the inflation is carried out by means of a check valve 24 in one side of the body flange 19, and which valve communicates with the space 23 around the body 12 by means of a port 25. A cap 26 may be provided over the valve 24, in the manner of valve caps employed on automobile tires. If desired, the valve 24 and the port 25 may be eliminated, and in which case the air chamber is filled and the resilient member is inflated before installing the same in the cylinder 10.

When installing the preferred form of construction, the resilient member 20 is deflated for ease of installation, and after the piston is in the cylinder 10, the resilient member is inflated by means of an air hose applied to the check valve 24. After the resilient member tends to wear, additional air pressure may be applied by removing the cylinder head, not shown, and supplying additional air pressure through the check valve 24. From the foregoing, it will be apparent that a slush pump piston in accordance with the invention will have a longer life, a constant seal, and that the liquid being pumped cannot enter between the body 12 and the resilient portions as in conventional slush pump pistons.

The invention is not limited to the exemplary construction herein shown and described, but may be made in many ways within the scope of the appended claim.

What is claimed is:

A piston for a slush pump, said piston comprising a round body triangular in cross section near the periphery thereof, the latter being wider than the portion thereof adjacent the body's center, and the peripheral surface of said body being concave around the outer surface thereof, a resilient member covering said peripheral surface and bonded to the respective faces of said body, said resilient member also being normally concave and the peripheral edges thereof being normally larger than the inside diameter of the cylinder in which it is adapted to fit, and means inflating the circumferential surface of said resilient body.

References Cited in the file of this patent

UNITED STATES PATENTS

| | | |
|---|---|---|
| 1,284,341 | Honegger | Nov. 12, 1918 |
| 1,417,514 | Glaser | May 30, 1922 |
| 1,662,725 | Toney | Mar. 13, 1928 |
| 1,678,365 | Sutliff | July 24, 1928 |
| 1,742,582 | Croner | Jan. 7, 1930 |
| 1,764,458 | McLean | June 17, 1930 |
| 2,022,599 | Leuschner | Nov. 26, 1935 |
| 2,211,456 | Caldwell | Aug. 13, 1940 |
| 2,392,182 | Payne | Jan. 1, 1946 |